United States Patent [19]

Blom

[11] Patent Number: 5,151,259
[45] Date of Patent: Sep. 29, 1992

[54] MODIFIED CRYSTALLINE ALUMINOSILICATE AND METHOD OF PREPARING THE SAME

[75] Inventor: Niels J. Blom, Hillerod, Denmark

[73] Assignee: Haldor Topsoe A/S, Denmark

[21] Appl. No.: 629,634

[22] Filed: Dec. 18, 1990

[30] Foreign Application Priority Data

Dec. 22, 1989 [DK] Denmark .............................. 6666/89

[51] Int. Cl.$^5$ .............................................. C01B 33/34
[52] U.S. Cl. ...................................... 423/328; 502/74; 502/77; 502/216; 502/219; 502/222; 208/46; 208/120; 208/135; 208/136; 208/137; 208/138; 585/531; 585/533
[58] Field of Search ............... 423/328, 329; 502/60, 502/64, 65, 66, 74, 77, 216, 219–223; 208/46, 120, 135–138; 585/531, 533

[56] References Cited

U.S. PATENT DOCUMENTS

| | | | |
|---|---|---|---|
| 3,322,690 | 5/1967 | Bilisoly | 502/73 |
| 3,373,109 | 3/1968 | Frilette et al. | 502/74 |
| 3,525,700 | 8/1970 | Steenberg et al. | 502/66 |
| 3,663,424 | 5/1972 | Jaffe | 208/59 |
| 3,669,873 | 6/1972 | Jaffe et al. | 208/59 |
| 3,684,691 | 8/1972 | Arey et al. | 208/59 |
| 3,709,814 | 1/1973 | Jaffe | 208/59 |
| 3,766,056 | 10/1973 | Young | 208/111 |
| 3,789,107 | 1/1974 | Elliott, Jr. | 423/329 |
| 3,816,341 | 6/1974 | Rabo et al. | 502/79 |
| 3,853,742 | 12/1974 | Ward | 208/111 |
| 3,949,059 | 4/1976 | Elliott, Jr. | 423/329 |
| 4,111,967 | 9/1978 | Martin et al. | 260/396 R |
| 4,191,663 | 3/1980 | Kuehl | 423/328 |
| 4,199,478 | 4/1980 | Mantovani et al. | 502/75 |
| 4,296,083 | 10/1981 | Rollmann | 423/329 |
| 4,299,686 | 11/1981 | Kuehl | 423/328 |
| 4,497,703 | 2/1985 | Bousquet et al. | 208/111 |
| 4,526,878 | 7/1985 | Takegami et al. | 423/328 |
| 4,578,372 | 3/1986 | Hoving et al. | 502/66 |
| 4,617,282 | 10/1986 | Van der Vleugel et al. | 502/66 |
| 4,710,485 | 12/1987 | Miller | 502/66 |
| 4,880,761 | 11/1989 | Bedard et al. | 502/215 |
| 4,902,844 | 2/1990 | Zones et al. | 423/328 |

Primary Examiner—R. Bruce Breneman
Attorney, Agent, or Firm—Ostrolenk, Faber, Gerb & Soffen

[57] ABSTRACT

A crystalline aluminosilicate having its anhydrous state a formula expressed in terms of mol ratios as follows:

$$xQ:0.01-0.1\ M_{2/n}O:0-0.8\ Z_2O_3:SiO_2:0.0001-0.5\ MeS.$$

wherein:
Q is an organic nitrogen compound;
Z is aluminium, boron, gallium or mixtures thereof;
x is between 0 and 0.5;
M is at least one metal cation of valence n; and
Me is at least one of the metals which form an insoluble sulfide compound.

20 Claims, No Drawings

MODIFIED CRYSTALLINE ALUMINOSILICATE AND METHOD OF PREPARING THE SAME

The present invention relates to a modified crystalline aluminosilicate and in particular to a metal sulfide modified crystalline aluminosilicate zeolite, a method of preparing the same and catalytic reaction therewith.

In general, zeolites belong to the class of crystalline aluminosilicates with a three dimensional-network of tetrahedra $SiO_4$ and $AlO_4$, which by oxygen atoms join up into rings to form a complex network of cavities within the zeolite structure. Thereby, the ratio of the total aluminum and silicon atoms to oxygen atoms is 1:2 and excess of negative charge due to the tetrahedra of aluminum is balanced by the inclusion in the crystal of a cation. These charge balancing cations may be displaced by ion-exchange with various other cations.

A number of zeolites are known to have catalytic properties. One of such is the well known zeolite ZSM-5, which is described in U.S. Pat. No. 3,702,886. The zeolite of that disclosure has been prepared from a mixture containing a tetrapropylammonium compound, sodium oxide, an oxide of aluminum or gallium, an oxide of silicon or germanium and water. The gallium oxide and germanium oxide may, partly or entirely, replace aluminum oxide or silicon in the crystal lattice.

Various attempts have been made to improve the catalytic properties of crystalline aluminosilicate zeolites by modifying their crystal structure through replacement of aluminum with other metals such as gallium and boron, or by activating the zeolitic materials by ion-exchange, incorporation or admixture of various cationic compounds.

Thus, U.S. Pat. No. 4,180,689 discloses a gallium activated ZSM-5 type zeolite, in which gallium is impregnated on the surface of the zeolitic material or incorporated in the intracrystalline zeolite cavities as a gallium compound, which ionizes in aqueous solution. A similar activated ZSM-5 type zeolite is mentioned in U.S. Pat. No. 4,490,569, in which gallium and zinc have been deposited on the zeolitic material and wherein cations have been exchanged with gallium and zinc ions.

A disadvantage of the above mentioned methods of impregnating or admixing metal components to preformed zeolites is a heterogeneous distribution of admixed or impregnated metal-ions in cavities or pores of the zeolite crystal. The distribution of the metal-ions in the crystals treated by these methods is not predictable and their catalytic properties may be suppressed.

It has now been found that addition of insoluble metal sulfides to a reaction mixture from which a crystalline aluminosilicate zeolite is obtained, provides crystalline aluminosilicates with a homogeneous distribution of desired metals in the zeolite crystal and thus an improved catalytic properties.

Pursuant to this finding an object of the present invention is to provide a metal sulfide modified crystalline aluminosilicate having in its anhydrous state a formula expressed in terms of mole ratios, as follows:

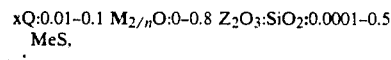
$$xQ:0.01-0.1\ M_{2/n}O:0-0.8\ Z_2O_3:SiO_2:0.0001-0.5\ MeS.$$

wherein:
Q is an organic nitrogen compound;
Z is aluminum, boron, gallium or mixtures thereof;
x is between 0 and 0.5;
M is at least one metal cation of valence n; and
Me is at least one of the metals, which form an water insoluble sulfide compound.

Preferably, Q is a tetraalkylammonium compound, which is represented by the formulae $R^1R^2R^3R^4N^+X^-$, where $R^1, R^2, R^3, R^4$ a methyl-, ethyl-, propyl- or butyl-group, and X is a halide or a hydroxide ion.

Most preferably, Q is a tetrapropylammonium salt.

It is further preferred to select the sulfide forming metal Me from the group consisting of cadmium, cobalt, copper, iron, lead, manganese, nickel, silver, tin, zinc, platinum, palladium, rhodium, ruthenium, and mixtures thereof.

Particular preferred metals Me are zinc, copper and combinations thereof.

The metal sulfide modified crystalline aluminosilicate zeolites according to the invention are prepared by a process comprising the following steps:

i) preparing an insoluble sulfide of the metal Me by precipitation of an aqueous solution of a soluble salt of Me with a soluble sulfide compound;

ii) preparing a mixture comprising a source for an oxide of silicium, a source for an oxide of Z (if any), an oxide of M, an organic nitrogen compound Q (if any) and water, and having a composition in terms of mole ratios as follows;
$Z_2O_3/SiO_2 = 0-0.08$
$H_2O/SiO_2 = 5-200$
$M/SiO_2 = 0.01-3.0$
$Z/SiO_2 = 0-2.0$
$OH^-/SiO_2 = 0-1.0$ iii) admixing the insoluble metal sulfide precipitate of step i) to the mixture of step ii) in a mole ratio of $Me/SiO_2 = 0.0001-0.5$;

iv) maintaining the mixture of step iii) at a temperature of about 80° C. to 200° C. until crystals of the aluminosilicate are formed; and v) separating and drying the so formed crystals at a temperature of between 20° C. and 130° C.

Suitable sources of silicon include silicic acid, tetraalkyl silicates, sodium silicate and colloidal silica.

Sources of aluminum may comprise any of the soluble salts of aluminum, such as acetate, halogenides, citrate, nitrate and sulphate, and aluminates, such as sodium and potassium aluminate.

The mole ratios of the components contained in the reaction mixture may vary, depending on the content of the components in the described aluminosilicate zeolite. Preferred ranges of the mole ratios are indicated below:

|  | preferred | most preferred |
| --- | --- | --- |
| $SiO_2/Z_2O_3 =$ | 300-2000 | 20-1000 |
| $M/SiO_2 =$ | 0.01-2.0 | 0.02-0.7 |
| $Q/SiO_2 =$ | 0-1.0 | 0-0.4 |
| $OH/SiO_2 =$ | 0-0.5 | 0.02-0.4 |
| $H_2O/SiO_2 =$ | 5-150 | 6-100 |
| $Me/SiO_2 =$ | 0.0005-0.4 | 0.005-0.3 |

The metal sulfide modified crystalline aluminosilicate zeolites thus prepared have a monophasic structure with an X-ray diffraction pattern, closely related to that of ZSM-5. It is believed that the metal sulfide is incorporated as such in the aluminosilicate crystals, and a homogeneous and continuous phase of the metal sulfide and aluminosilicate zeolite is formed.

Contrary to the known modified aluminosilicates, any of the metal sulfide modified aluminosilicate zeolites of this invention represent a single, definite compound with exactly defined proportion of each of the metals.

The zeolites of the present invention may suitably be used as catalyst in the conversion of hydrocarbons, such as cracking or polymerization reactions. They are particular attractive as catalysts in the conversion of olefins and paraffins to aromatic hydrocarbons.

When prepared in the presence of an organic nitrogen compound the modified aluminosilicate zeolites are activated by heating at about 500° C. for about one hour in air or nitrogen, and preferably brought to their hydrogen form by ion exchange with a proton donating solution.

The original cations may for example be ion-exchanged with other ions. Catalytically active forms of these would include hydrogen, ammonium, rare earth metals, gallium, platinum, or other cations capable of replacing the original cations.

It is further preferred to composite the modified zeolite catalyst with a matrix binder such as clays, alumina, silica, titania, magnesia, zirconia, thoria, and zinc oxide or metal sulfide, or compositions thereof. The modified zeolite may be incorporated, combined, dispersed or otherwise intimately admixed with a matrix, which itself can be catalytically active or inactive. The modified zeolite catalyst is thereby supported on the carrier in finely divided form in proportions, which may vary between about 1 and 99 per cent by weight calculated on the total amount of catalyst and matrix binder.

The present invention will be more fully described by the following Examples and Comparative Examples.

EXAMPLE 1

Preparation of a ZnS modified aluminosilicate (mole $SiO_2$/mole $Al_2O_3 = 49.16$).

A reaction mixture was prepared by the following procedure:

(a) A solution of 12 g $Na_2S.9$ $H_2O$ in 50 g of hot water were added slowly with stirring to 9.6 g $Zn(CH_3COO)_2.2$ $H_2O$ in 400 g of hot water, and maintained at 80° C. for 16 hours. The mixture was allowed to stand at room temperature for about 2 weeks, before the solid metal sulfide product was separated from the liquor by filtration.

(b) 1.2 g $NaAlO_2$ (49 wt% $Al_2O_3$, 40 wt% $Na_2O$, 11 wt% $H_2O$) and 7.9 g tetrapropylammoniumbromide (TPABr) were dissolved in 30 gram of $H_2O$ and adjusted with $H_2SO_4$ to pH=8.5 and blended with the metal sulfide prepared in (a).

(c) 63.3 g sodium silicate (27.8 wt% $SiO_2$, 8.2 wt% $Na_2O$, 64 wt% $H_2O$) in 15 g of $H_2O$ were added with stirring to 8.0 g conc. $H_2SO_4$ dissolved in 15 g of $H_2O$. The resultant gel was adjusted with a 4M NaOH solution to pH=8.5.

(d) 9.2 g NaCl were dissolved in 30 g of $H_2O$ and combined with the homogenized composition of (b) and (c) and mixed thoroughly.

The overall molar composition of the reaction mixture thus obtained was:
$SiO_2/Al_2O_3 = 50.88$
$Na/SiO_2 = 1.16$
$TPA/SiO_2 = 0.10$
$H_2O/SiO_2 = 31.46$
$Zn/SiO_2 = 0.15$ The reaction mixture was crystallized at autogenous pressure in a polypropylene-lined static autoclave at 130° C. for about 96 hours. A solid crystalline product was separated by filtration, washed with water, and dried at 120° C. for 16 hours.

Chemical analysis of a sample of this product gave the following composition: 31.10 wt% Si, 1.22 wt% Al, 1.30 wt% Na, 9.90 wt% Zn, 4.90 wt% S. The molar composition was:
$SiO_2Al_2O_3 = 49.16$
$Zn/SiO_2 = 0.14$
$Zn/S = 0.99$ The X-ray powder diffraction pattern of the obtained metal sulfide zeolite product contained the lines of ZSM-5 and Sphalerite.

EXAMPLE 2

Preparation of a ZnS/CuS modified aluminosilicate (mole $SiO_2$/mole $Al_2O_3 = 47.02$).

A reaction mixture was prepared by the following procedure:

(a) A solution of 15.2 g $Na_2S.9$ $H_2O$ in 50 g of hot water were slowly added with stirring to 7.12 g $Zn(CH_2COO)_2.2$ $H_2O$ and 6.4 g $Cu(NO_3)_2.3$ $H_2O$ in 500 g of hot water, and maintained at 80° C. for 4 hours. The mixture was allowed to stand at room temperature for 2 days before the solid metal sulfide product was separated from the mother liquor by filtration.

(b) 1.2 g $NaAlO_2$ (49 wt% $Al_2O_3$, 40 wt% $Na_2O$, 11 wt% water) and 4.1 g TPABr were dissolved in 30 gram of $H_2O$ and adjusted with $H_2SO_4$ to pH=8.5.

(c) 63.3 g sodium silicate (27.8 wt% $SiO_2$, 8.2 wt% $Na_2O$, 64 wt% $H_2O$) in 15 g of $H_2O$ were added with stirring to 8.0 g conc. $H_2SO_4$ dissolved in 15 g of $H_2O$. The resulting gel was adjusted with a 4M NaOH solution to pH=8.5 and blended with the filtrate obtained in (a).

(d) 9.2 g NaCl were dissolved in 25 g of $H_2O$, then combined with the homogenized composition of (b) and (c) and mixed thoroughly.

The overall molar composition of the reaction mixture thus obtained was:
$SiO_2Al_2O_3 = 50.88$
$Na/SiO_2 = 1.16$
$TPA/SiO_2 = 0.05$
$H_2O/SiO_2 = 28.92$
$Zn/SiO_2 = 0.11$
$Cu/SiO_2 = 0.09$
$Zn/Cu = 1.23$ The reaction mixture was crystallized at autogenous pressure in a polypropylene-lined static autoclave at 130° C. for about 96 hours. A solid crystalline product was separated by filtration, washing with water, and drying at 120° C. for 16 hours.

Chemical analysis of a sample of this product gave the following composition: 25.60 wt% Si, 1.05 wt% Al, 0.79 wt% Na, 6.40 wt% Zn, 5.40 wt% Cu, 5.30 wt% S. The molar composition was:
$SiO_2/Al_2O_3 = 47.02$
$Zn/SiO_2 = 0.11$
$Cu/SiO_2 = 0.09$
$Zn/Cu = 1.22$ The X-ray powder diffraction pattern of the obtained metal sulfide zeolite product contained the lines of ZSM-5, copper sulfide and Sphalerite.

EXAMPLE 3

Preparation of a ZnS modified aluminosilicate (mole $SiO_2$/mole $Al_2O_3 = 30.23$).

(a) A solution of 156.4 g $Na_2S.9\ H_2O$ in 200 g of hot water were added with stirring to a solution of 109.7 g $Zn(CH_3COO)_2.2H_2O$ in 1000 g of hot water, and maintained at 80° C. for 4 hours. The mixture was allowed to stand at room temperature for about 2 days before the solid product was separated from the liquor by filtration.

(b) A solution of 40 g $NaAlO_2$ in 400 g of $H_2O$ were mixed with 800 g sodium silicate and stirred until a homogeneous phase appeared.

(c) A mixture of 800 g LUDOX HS 40 (supplied by E. I. DU PONT) and 25 g of the solid crystalline product of Example 1, which has been calcined at 600° C. to remove the tetrapropylammonium compound present in the "as-synthesized" form, was added to the mixture of step (b), and mixed thoroughly.

(d) The mixture of (c) was mixed with the filtrered product of step (a) and stirred. The molar composition of the reaction mixture thus obtained (excluding the contribution of the added solid crystalline product of Example 1) was:
$SiO_2/Al_2O_3 = 47.05$
$Na/SiO_2 = 0.31$
$H_2O/SiO_2 = 8.58$
$Zn/SiO_2 = 0.055$ The reaction mixture was crystallized at autogenous pressure in a static autoclave at 130° C. for about 120 hours. A solid crystalline product was then separated by filtration, washing with water and drying at 120° C. for 4 hours.

Chemical analysis of a sample of this product gave the following composition: 34.8 wt% Si, 2.22 wt% Al, 2.32 wt% Na, 4.38 wt% Zn and 2.2 wt% S. The molar composition was:
$SiO_2/Al_2O_3 = 30.23$
$Zn/SiO_2 = 0.054$
$Zn/S = 0.97$ The X-ray powder diffraction pattern of the metal sulfide aluminosilicate zeolite contained the lines of ZSM-5.

EXAMPLE 4A

Preparation of a ZnS modified aluminosilicate (mole $SiO_2$/mole $Al_2O_3 = 77.55$).

A reaction mixture was prepared by the following procedure:

(a) An acid alumina-zinc solution was prepared by dissolving 6.6 g $Al_2(SO_4)_3.18\ H_2O$, 23.7 g tetrapropylammoniumbromide and 5.66 g $Zn(CH_3CO)_2.2\ H_2O$ in 100 g of $H_2O$, followed by 15.9 g conc. $H_2SO_4$.

(b) A sodium silicate solution was prepared by mixing 189.9 g sodium silicate (27.8 wt% $SiO_2$, 8.2 wt% $Na_2O$, 64 wt% $H_2O$) and 110 g of $H_2O$.

(c) A gel was formed by adding simultaneously the sodium silicate solution (b) and the acid alumina-zinc solution (a) to a stirred polypropylene beaker containing 27.6 g NaCl in 90 g of $H_2O$. After stirring for 1 hour the pH was adjusted to about 9 by addition of 12 g sodium silicate.

To the resultant mixture was further added 8.66 g $Na_2S.9\ H_2O$ in 25 g of $H_2O$. After vigorous mixing the mixture was allowed to stand for 3 days at room temperature. The molar composition was:
$SiO_2/Al_2O_3 = 93.98$
$Na/SiO_2 = 1.08$
$TPA/SiO_2 = 0.09$
$H_2O/SiO_2 = 27.26$
$Zn/SiO_2 = 0.028$ The reaction mixture thus obtained was crystallized at autogenous pressure in a static autoclave at 140° C. for 82 hours. A solid crystalline product was separated by filtration, washed with water and dried at 130° C. for 16 hours.

Chemical analysis of this product gave the following composition: 37.8 wt% Si, 0.94 wt% Al, 1.06 wt% Na, 2.23 wt% Zn, 1.05 wt% S.

The molar composition was:
$SiO_2/AlO_2O_3 = 77.55$
$Zn/SiO_2 = 0.025$
$Zn/S = 1.04$ The X-ray powder diffraction pattern contained the lines of ZSM-5.

EXAMPLE 4B

Preparation of a ZnS/CuS modified aluminosilicate (mole $SiO_2$/mole $Al_2O_3 = 73.64$).

A reaction mixture was prepared by the following procedure:

(a) An acid alumina-zinc-copper solution was prepared by dissolving 6.6 g $Al_2(SO_4)_3.18\ H_2O$, 23.7 g TPABr and 1.81 g $Zn(CH_3COO)_2.2\ H_2O$, 1.6 g $Cu(NO_3)_2.3\ H_2O$ in 100 g of $H_2O$, followed by 15.9 g conc. $H_2SO_4$.

(b) A sodium silicate solution was prepared by mixing 189.9 g sodium silicate (27.8 wt% $SiO_2$, 8.2 wt% $Na_2O$, 64 wt% $H_2O$) and 110 g of $H_2O$.

(c) A gel was formed by adding simultaneously the sodium silicate solution (b) and the acid (a) solution alumina-zinc-copper to a stirred polypropylene beaker containing 27.6 g NaCl in 90 g of $H_2O$. After stirring for 1 hour the pH was adjusted to about 8.4 by addition of 5 g sodium silicate.

To this mixture was further added 5.1 g $Na_2S.9\ H_2O$ in 25 g of $H_2O$. After vigorous mixing the reaction mixture, thus obtained, was allowed to stand for 3 days at room temperature.

The molar composition was:
$SiO_2/Al_2O = 91.12$
$Na/SiO_2 = 1.09$
$TPA/SiO_2 = 0.10$
$H_2O/SiO_2 = 27.87$
$Zn/SiO_2 = 0.009$
$Cu/SiO_2 = 0.007$
$Zn/Cu = 1.25$ The reaction mixture was crystallized at autogenous pressure in a static autoclave at 140° C. for 82 hours. A solid crystalline product was separated by filtration, the filtrate washed with water and dried at 130° C. for 16 hours. Chemical analysis of the product gave the following composition: 37.8 wt% Si, 0.99 wt% Al, 1.11 wt% Na, 0.84 wt% Zn, 0.63 wt% Cu, 0.68 wt% S.

The molar composition was:
$SiO_2/Al_2O_3 = 73.64$
$Zn/SiO_2 = 0.0095$
$Cu/SiO_2 = 0.007$
$Zn/Cu = 1.29$ The X-ray powder diffraction pattern contained the lines of ZSM-5.

EXAMPLE 5A

Preparation of a ZnS modified aluminosilicate (mole $SiO_2$/mole $Al_2O_3 = 351.0$).

A reaction mixture was prepared by the following procedure:

(a) A solution of 55.27 g $Na_2S.9 H_2O$ in 150 g of hot water were slowly added with stirring to 38.79 g $Zn(CH_3COO)_2.2 H_2O$ in 1000 g of hot water, and maintained at 60° C. for 7 hours. The reaction mixture was allowed to stand at room temperature for about 2 days before a solid product was separated from the liquor by filtration.

(b) 3.8 g $Al_2(SO_4)_3.18 H_2O$ and 49.8 g TPABr were dissolved in 562 g of $H_2O$ and added 19.25 g conc. $H_2SO_4$.

(c) 225 g sodium silicate (27.8 wt% $SiO_2$, 8.2 wt% $Na_2O$, 64 wt% $H_2O$) were dissolved in 410 g of $H_2O$.

(d) A gel was formed by mixing with stirring simultaneously the composition of (b) and (c) with 20.2 g NaCl dissolved in 210 g $H_2O$.

(e) 185 g LUDOX HS40 (supplied by E. I. DU PONT) and 136 g of $H_2O$ were added to the resultant gel of (d).

(f) The filtrate of (a) was mixed with the gel of (e) and mixed until a homogeneous phase appeared.

The overall molar composition of the obtained reaction mixture was:
$SiO_2/Al_2O_3 = 398.9$
$Na/SiO_2 = 0.43$
$TPA/SiO_2 = 0.08$
$OH^-/SiO_2 = 0.093$
$H_2O/SiO_2 = 40.69$
$Zn/SiO_2 = 0.078$ The reaction mixture was crystallized at autogenous pressure in a polypropylene-lined static autoclave at 138° C. for about 120 hours. A solid crystalline product was separated by filtration, washed with water, and dried at 130° C. for 24 hours.

Chemical analysis of a sample of this product gave the following composition: 36.40 wt% Si, 0.2 wt% Al, 0.42 wt% Na, 6.1 wt% Zn, 2.80 wt% S.

The molar composition was:
$SiO_2/Al_2O_3 = 351.0$
$Zn/SiO_2 = 0.072$
$Zn/S = 1.07$ The X-ray powder diffraction pattern contained the lines of ZSM-5.

EXAMPLE 5B

Preparation of a ZnS modified boron aluminosilicate (mole $SiO_2$/mole $B_2O_3 = 477.0$).

A reaction mixture was prepared by the following procedure:

(a) A solution of 55.27 g $Na_2S.9 H_2O$ in 150 g of hot water were slowly added with stirring to 38.79 g $Zn(CH_3COO)_2.2 H_2O$ in 1000 g of hot water, and maintained at 60° C. for 7 hours and the reaction mixture was allowed to stand at room temperature for about 2 days before a solid product was separated from the liquor by filtration.

(b) 0.36 g $H_3BO_3$ and 49.8 g TPABr were dissolved in 562 g of $H_2O$ and added 19.25 g conc. $H_2SO_4$.

(c) 225 g sodium silicate (27.8 wt% $SiO_2$, 8.2 wt% $Na_2O$, 64 wt% $H_2O$) were dissolved in 410 g of $H_2O$.

(d) A gel was formed by mixing with stirring simultaneously the composition of (b) and (c) with 210 g $H_2O$.

(e) 185 g LUDOX HS40 (supplied by E. I. DU PONT) and 136 g of $H_2O$ were added to the resultant gel of (d).

(f) The filtrate of (a) was mixed with the gel of (e) and mixed until a homogeneous phase appeared.

The overall molar composition of the obtained reaction mixture was:
$SiO_2/B_2O_3 = 390.7$
$Na/SiO_2 = 0.28$
$TPA/SiO_2 = 0.08$
$OH^-/SiO_2 = 0.092$
$H_2O/SiO_2 = 40.49$
$Zn/SiO_2 = 0.078$ The reaction mixture was crystallized at autogenous pressure in a polypropylene-lined static autoclave at 138° C. for about 120 hours. A solid crystalline product was separated by filtration, washed with water, and dried at 130° C. for 24 hours.

Chemical analysis of a sample of this product gave the following composition: 37.40 wt% Si, 0.06 wt% B, 0.38 wt% Na, 6.3 wt% Zn, 2.90 wt% S. The molar composition was:
$SiO_2/B_2O_3 = 477.0$
$Zn/SiO_2 = 0.073$
$Zn/S = 1.06$ The X-ray powder diffraction pattern contained the lines of ZSM-5.

EXAMPLE 5C

Preparation of a ZnS modified gallium aluminosilicate (mole $SiO_2$/mole $Ga_2O_3 = 396.1$).

A reaction mixture was prepared by the following procedure:

(a) A solution of 55.27 g $Na_2S.9 H_2O$ in 150 g of hot water was slowly added with stirring to 38.79 g $Zn(CH_3COO)_2.2 H_2O$ in 1000 g of hot water, and maintained at 60° C. for 7 hours. The reaction mixture was allowed to stand at room temperature for about 2 days before a solid product was separated from the liquor by filtration.

(b) 2.4 g $Ga(NO_3)_3.9 H_2O$ and 49.8 g TPABr were dissolved in 562 g of $H_2O$ and added 19.25 g conc. $H_2SO_4$.

(c) 225 g sodium silicate (27.8 wt% $SiO_2$, 8.2 wt% $Na_2O$, 64 wt% $H_2O$) were dissolved in 410 g of $H_2O$.

(d) A gel was formed by mixing with stirring simultaneously the composition of (b) and (c) with 210 g $H_2O$.

(e) 185 g LUDOX HS40 (supplied by E. I. DU PONT) and 136 g of $H_2O$ were added to the resultant gel of (d).

(f) The filtrate of (a) was mixed with the gel of (e) and mixed until a homogeneous phase appeared.

The overall molar composition of the obtained reaction mixture was:
$SiO_2/Ga_2O_3 = 396.1$
$Na/SiO_2 = 0.43$
$TPA/SiO_2 = 0.08$
$OH^-/SiO_2 = 0.091$
$H_2O/SiO_2 = 40.17$
$Zn/SiO_2 = 0.078$ The reaction mixture was crystallized at autogenous pressure in a polypropylene-lined static autoclave at 138° C. for about 120 hours. A solid crystalline product was separated by filtration, washed with water, and dried at 130° C. for 24 hours.

Chemical analysis of a sample of this product gave the following composition: 36.12 wt% Si, 0.42 wt% Ga, 0.44 wt% Na, 5.8 wt% Zn, 2.72 wt% S.

The molar composition was:
$SiO_2/Ga_2O_3 = 428.2$
$Zn/SiO_2 = 0.069$
$Zn/S = 1.05$ The X-ray powder diffraction pattern contained the lines of ZSM-5.

EXAMPLE 6

Preparation of a ZnS modified aluminosilicate (mole $SiO_2/Al_2O_3 = 889.0$).

A reaction mixture was prepared by the following procedure:

(a) 63.3 g sodium silicate were dissolved in 36.6 g of water at 0° C.

(b) 7.9 g TPABr and 5.3 g conc. $H_2SO_4$ were dissolved in 30 g $H_2O$ at 0° C.

(c) The solutions obtained in (a) and (b) were then added to a slurry of 1.0 g NaF, 9.2 g NaCl and 3.0 g ZnS (supplied by Aldrich) in 33 g of water under stirring and mixed thoroughly at 0° C.

The molar composition of this reaction mixture was:
$Na/SiO_2 = 1.19$
$TPA/SiO_2 = 0.10$
$H_2O/SiO_2 = 26.54$
$Zn/SiO_2 = 0.11$ The reaction mixture was crystallized at autogenous pressure in a polypropylene-lined static autoclave at 130° C. for about 72 hours. A solid crystalline product was separated by filtration, washed with water, and dried at 120° C. for 16 hours.

Chemical analysis of a sample of this product gave the following compositions : 34.12 wt% Si, 0.07 wt% Al, 0.24 wt% Na, 9.50 wt% Zn, 4.40 wt% S.

The molar composition was:
$SiO_2/Al_2O_3 = 889$
$Zn/SiO_2 = 0.12$
$Zn/S = 1.06$ The X-ray powder diffraction pattern contained the lines of ZSM-5 and Sphalerite.

EXAMPLES 7-10

Preparation of CuS, FeS, CoS and RuS modified aluminosilicates.

EXAMPLE 7

A reaction mixtures were prepared by the following procedure:

(a) A solution of 6.0 g $Na_2S.9\ H_2O$ in 50 g of hot water was slowly added with stirring to 5.0 g $Cu(NO_3)_2.3\ H_2O$ in 500 g of hot water, and maintained at 80° C. for 2 hours. The mixture was allowed to stand at room temperature for about 1 day before the solid metal sulfide product was separated from the liquor by filtration.

EXAMPLE 8-10

The metal sulfide producing solutions of Example 8-10 were made in a similar manner as Example 7 using the ingredients as below.

| Ingredients in gram | Example | | |
| used in (a): | 8 | 9 | 10 |
|---|---|---|---|
| $Na_2S.9H_2O$ | 12.0 | 5.0 | 3.0 |
| $Fe(NO_3)_3.9H_2O$ | 9.0 | | |
| $Co(NO_3)_2.6H_2O$ | | 1.3 | |
| $RuCl_3$ | | | 0.02 | b) 1.2 g $NaAlO_2$ (49 wt% $Al_2O_3$, 40 wt% $Na_2O$, 11 wt% $H_2O$) and 7.9 g TPABr were dissolved in 30 gram of $H_2O$ and adjusted with conc. $H_2SO_4$ to pH=8.5 and blended with (a) the product of (a).

(c) 63.3 g sodium silicate (27.8 wt% $SiO_2$, 8.2 wt% $Na_2O$, 64 wt% $H_2O$) in 15 g of $H_2O$ were added with stirring to 8.0 g conc. $H_2SO_4$ dissolved in 15 g of $H_2O$. The resulting gel was adjusted with a 4M NaOH solution to pH=8.5.

(d) 9.2 g NaCl was dissolved in 30 g of $H_2O$ and combined with the homogenized composition of (b) and (c) and mixed thoroughly.

The overall molar composition of the reaction mixture thus obtained was:

| | Example | | | |
|---|---|---|---|---|
| | 7 | 8 | 9 | 10 |
| $SiO_2/Al_2O_3$ | 50.88 | 50.88 | 50.88 | 50.88 |
| $Na/SiO_2$ | 1.16 | 1.16 | 1.16 | 1.16 |
| $TPA/SiO_2$ | 0.10 | 0.10 | 0.10 | 0.10 |
| $H_2O/SiO_2$ | 30.66 | 31.22 | 30.98 | 28.56 |
| $Cu/SiO_2$ | 0.071 | | | |
| $Fe/SiO_2$ | | 0.076 | | |
| $Co/SiO_2$ | | | 0.015 | |
| $Ru/SiO_2$ | | | | 0.00033 |

The reaction mixture was crystallized at autogenous pressure in a polypropylene-lined static autoclave at 130° C. for about 92 hours. A solid crystalline product was separated by filtration, washed with water, and dried at 120° C. for 16 hours.

Chemical analysis of a sample of this product gave the following compositions, wt%:

| | Example | | | |
|---|---|---|---|---|
| | 7 | 8 | 9 | 10 |
| Si | 35.80 | 35.70 | 38.40 | 38.60 |
| Al | 1.41 | 1.39 | 1.31 | 1.42 |
| Na | 1.75 | 1.78 | 0.97 | 1.39 |
| Cu | 5.67 | | | |
| Fe | | 3.70 | | |
| Co | | | 1.28 | |
| Ru | | | | 0.053 |
| S | 2.51 | 2.05 | 0.59 | 0.04 |
| Composition, mole ratio: | | | | |
| $SiO_2/Al_2O_3$ | 48.97 | 49.53 | 56.6 | 46.61 |
| $Cu/SiO_2$ | 0.07 | | | |
| $Cu/S$ | 1.34 | | | |
| $Fe/SiO_2$ | | 0.052 | | |
| $Fe/S$ | | 1.033 | | |
| $Co/SiO_2$ | | | 0.016 | |
| $Co/S$ | | | 1.18 | |
| $Ru/SiO_2$ | | | | 0.00038 |
| $Ru/S$ | | | | 0.42 |

The X-ray powder diffraction pattern of the metal sulfide zeolite product contained the lines of ZSM-5.

EXAMPLE 11-19

Preparation of CuS/ZnS modified aluminosilicates with different Cu/Zn content.

EXAMPLE 11

A reaction mixture was prepared by the following procedure: (a) A solution of 26.3 g $Na_2S.9\ H_2O$ in 100 g of hot water was slowly added with stirring to 22.4 g $Zn(CH_3COO)_2.2\ H_2O$ in 800 g of hot water, and maintained at 80° C. for 2 hours. The mixture was allowed to stand at room temperature for about 3 days before the solid metal sulfide product was separated from the liquor by filtration.

(b) 19.8 g $Al_2(SO_4)_3.18\ H_2O$ and 71.1 g TPABr were dissolved in 297 gram of $H_2O$ and mixed with 47.7 g conc. $H_2SO_4$.

(c) 570.0 g sodium silicate (27.8 wt% $SiO_2$, 8.2 wt% $Na_2O$, 64 wt% $H_2O$) in 329.5 g of $H_2O$.

(d) 82.8 g NaCl was dissolved in 270 g of $H_2O$ and solution (b) and (c) were added simultaneously under vigorous mixing (in Example 12 105.0 g KCl were used instead of 82.8 g NaCl).

(e) The resultant gel (d) was mixed with (a) until a homogeneous phase appeared.

EXAMPLE 12-19

In Example 12-19 a solid metal sulfide product was made in a similar manner as in Example 11 using the ingredients as shown below:
Ingredients in gram used in (a):

|  | Example | | | | | | | |
|---|---|---|---|---|---|---|---|---|
|  | 12 | 13 | 14 | 15 | 16 | 17 | 18 | 19 |
| $Na_2S.9H_2O$ | 39.5 | 17.55 | 41.08 | 84.00 | 18.49 | 18.80 | 332.37 | 8.50 |
| $Zn(CH_3COO)_2.2H_2O$ | 18.5 | 8.54 | 20.42 | 40.73 | 10.30 | 11.79 | 76.46 | 7.04 |
| $Cu(NO_3)_2.3H_2O$ | 15.5 | 7.47 | 17.14 | 35.90 | 2.30 | 1.30 | 156.0 | 0.0 |
| $H_2O$ total | 900 | 900 | 900 | 900 | 900 | 900 | 2400 | 900 |

The reaction mixture was then obtained as further described under Example 11 step (b) through (e).

The overall molar composition of the reaction mixtures thus obtained were:

|  | Example | | | | | | | | |
|---|---|---|---|---|---|---|---|---|---|
|  | 11 | 12 | 13 | 14 | 15 | 16 | 17 | 18 | 19 |
| $SiO_2/Al_2O_3$ | 88.84 | 88.84 | 88.84 | 88.84 | 88.84 | 88.84 | 88.84 | 88.84 | 88.84 |
| $Na/SiO_2$ | 1.11 | 0.57 | 1.11 | 1.11 | 1.11 | 1.11 | 1.11 | 1.11 | 1.11 |
| $TPA/SiO_2$ | 0.10 | 0.10 | 0.10 | 0.10 | 0.10 | 0.10 | 0.10 | 0.10 | 0.10 |
| $H_2O/SiO_2$ | 29.54 | 29.33 | 28.20 | 30.56 | 31.25 | 28.65 | 28.60 | 33.10 | 27.89 |
| $Zn/SiO_2$ | 0.039 | 0.032 | 0.015 | 0.035 | 0.071 | 0.018 | 0.02 | 0.132 | 0.012 |
| $Cu/SiO_2$ | 0.0 | 0.024 | 0.012 | 0.027 | 0.056 | 0.0036 | 0.002 | 0.245 | 0.0 |
| Zn/Cu | 0.0 | 1.31 | 1.26 | 1.31 | 1.25 | 4.92 | 9.95 | 0.538 | 0.0 |
| $K/SiO_2$ |  | 0.54 |  |  |  |  |  |  |  |

The reaction mixture was crystallized at autogenous pressure in a polypropylene-lined static autoclave at 140° C. for about 92 hours. A solid crystalline product was separated by filtration, washed with water, and dried at 130° C. for 16 hours.

Chemical analysis of a sample of this product gave the following compositions, wt%:

|  | Example | | | | | | | | |
|---|---|---|---|---|---|---|---|---|---|
|  | 11 | 12 | 13 | 14 | 15 | 16 | 17 | 18 | 19 |
| Si = | 37.00 | 35.80 | 36.80 | 34.10 | 31.10 | 37.60 | 37.34 | 24.56 | 37.11 |
| Al = | 1.01 | 0.85 | 0.98 | 0.92 | 0.83 | 1.04 | 1.01 | 0.66 | 1.03 |
| Na = | 1.21 | 0.56 | 1.02 | 0.82 | 0.73 | 1.08 | 1.07 | 0.88 | 1.13 |
| Zn = | 3.00 | 2.61 | 1.32 | 2.82 | 5.10 | 1.52 | 1.65 | 7.48 | 0.93 |
| Cu = | 0.00 | 2.01 | 0.98 | 2.15 | 4.00 | 0.30 | 0.16 | 13.51 | 0.0 |
| S = | 1.35 | 2.11 | 1.05 | 2.22 | 4.00 | 0.85 | 0.84 | 9.92 | 0.44 |
| K = |  | 0.74 |  |  |  |  |  |  |  |
| Composition, mole ratio: | | | | | | | | | |
| $SiO_2/Al_2O_3$ = | 70.65 | 81.26 | 72.42 | 71.48 | 72.26 | 69.73 | 71.30 | 71.77 | 69.48 |
| $Zn/SiO_2$ = | 0.035 | 0.031 | 0.015 | 0.035 | 0.070 | 0.017 | 0.019 | 0.130 | 0.011 |
| $Cu/SiO_2$ = | 0.0 | 0.025 | 0.012 | 0.028 | 0.057 | 0.0035 | 0.0019 | 0.242 | 0.0 |
| Zn/Cu = | — | 1.263 | 1.31 | 1.276 | 1.24 | 4.93 | 10.03 | 0.538 | 0.0 |

The X-ray powder diffraction pattern contained the lines of ZSM-5.

EXAMPLE 20-21

Test of the above sulfide modified aluminosilicates.

The crystalline product prepared in Example 11 was activated by calcination in air at 550° C. for 4 hours, and further activated by ion-exchange three times using 10 ml of 2M acetic acid solution per g product for 1 hour in each ion-exchange step, washed with water, dried at 120° C. for 16 hours and finally calcined in air at 550° C. for 6 hours.

The resulting hydrogen form of the product was tested for its catalytic activity in the conversion of hydrocarbons to aromatics.

The aromatization reaction was carried out by loading 1 gram of the catalyst in a quartz reactor tube and passing through the desired hydrocarbon(s) to be converted at atmospheric pressure.

After different times on stream the total effluent was analyzed by on line gas chromatography. The hydrocarbon distribution (wt%) was calculated by disregarding the composition of the feed.

The temperature, flow rates and the results of the aromatization reaction are shown in Table 1, which follows.

The terms used in Table 1 and in the following Tables are defined as follows:
Selectivity = (Hydrocarbons converted to a specific product × 100)/Hydrocarbon consumed.

Yield = (Selectivity to the specific product × conversion)/100.

EXAMPLE 22-25

Test of a comparative catalysts.

EXAMPLE 22

An aluminosilicate as prepared in Example 11, but without addition of the metal sulfide, was activated as described in Example 20.

The resulting hydrogen form (H-ZSM-5; $SiO_2/AlO_3=72$) was mixed with ZnS (supplied by Aldrich) and calcined in air at 550° C. for 6 hours. The final catalyst (A) containing about 3 wt% of admixed Zn was tested for aromatization activity as described in Example 20. The process conditions used and the results obtained are given in the Table 1.

EXAMPLE 23

The hydrogen form of the H-ZSM-5 as described under Example 22 was mixed with ZnO (supplied by Aldrich) and calcined in air at 550° C. for 6 hours to a final content of about 3 wt% of added Zn. This catalyst (B) was tested for aromatization activity as described in Example 20. The process conditions used and the results obtained are given in Table 1.

EXAMPLE 24

Five gram of the hydrogen form of H-ZSM-5 as described under Example 22 and 0.55 g zinc acetate dihydrate were mixed with 10 g of water. The mixture was evaporated to dryness and the residue was calcined in air at 550° C. for 6 hours. The final catalyst (C) containing about 3 wt% of added Zn was tested for aromatization activity as described in Example 20. The process conditions used and the results obtained are given in Table 1.

EXAMPLE 25

A ZnO containing aluminosilicate was prepared in a similar procedure to that of Example 11 with the exception that no metal sulfide, but ZnO was added to the reaction mixture. The ZnO containing reaction mixture was autoclaved as described in Example 11. The resulting catalyst was activated as described in Example 20. The final catalyst (D) containing about 3 wt% of added Zn was tested for aromatization activity as described above. The process conditions and the results of the aromatization reactions are shown in Table 1.

The results of Example 20-25 set forth in Table 1 below show that the catalyst of this invention (prepared under Example 20 and 21) provide a higher selectivity for the production of aromatics and a lower $CH_4$ and $C_2H_6$ production compared to comparative catalysts A-D, when used in the conversion of isobutane to aromatics.

TABLE 1

| | Example | | | | | |
|---|---|---|---|---|---|---|
| | 20 | 21 | 22 | 23 | 24 | 25 |
| Zn wt % | 3 | 3 | 3 | 3 | 3 | 3 |
| Temp. °C. | 502 | 502 | 502 | 502 | 502 | 502 |
| On stream time. Hr | 3 | 5 | 2 | 3 | 4 | 2 |
| Feed | i-C4H10 | i-C4H10 | i-C4H10 | i-C4H10 | i-C4H10 | i-C4H10 |
| WHSV (§) | 1.66 | 1.66 | 1.66 | 1.66 | 1.66 | 1.66 |
| Conversion wt % | 96.07 | 96.33 | 99.05 | 99.92 | 99.63 | 99.84 |
| Hydrocarbon-Distribtuion wt % | | | | | | |
| Methane | 9.57 | 10.62 | 11.44 | 15.72 | 16.38 | 16.87 |
| Ethylene | 2.99 | 2.84 | 0.95 | 0.42 | 0.50 | 0.37 |
| Ethane | 4.60 | 4.73 | 10.65 | 19.56 | 17.40 | 16.13 |
| Propylene | 3.78 | 3.57 | 2.21 | 0.76 | 1.30 | 0.85 |
| Propane | 10.60 | 10.08 | 10.86 | 6.80 | 9.64 | 9.21 |
| Butanes | 0.69 | 0.67 | 0.42 | 0.06 | 0.19 | 0.07 |
| Butenes | 4.20 | 4.03 | 3.62 | 0.46 | 1.52 | 0.74 |
| C5+ PON (*) | 0.64 | 0.63 | 0.12 | 0.00 | 0.02 | 0.00 |
| Benzene | 14.80 | 14.98 | 16.73 | 15.40 | 13.82 | 16.73 |
| Toluene | 28.03 | 27.90 | 27.27 | 23.43 | 22.83 | 25.26 |
| Xylenes | 14.80 | 14.92 | 13.18 | 13.05 | 12.47 | 11.65 |
| C9+ Ar. (**) | 5.29 | 5.03 | 2.57 | 4.35 | 3.94 | 2.12 |
| Product Selectivity. % | | | | | | |
| Aromatics | 62.92 | 62.83 | 59.75 | 56.23 | 53.06 | 55.76 |
| CH4 + C2H6 | 14.17 | 15.35 | 22.09 | 35.28 | 33.78 | 33.00 |
| Aromatic yields | 60.45 | 60.52 | 59.18 | 56.19 | 52.86 | 55.67 |

(*) C5− paraffins. olefins og naftenes.
(**) C9 aromatics and higher aromatics.
(§) Space velocity: g feel/g caalyst · hours.

EXAMPLES 26-33

These Examples illustrate aromatization of propane using a catalyst of this invention and the comparative catalyst, A, B and C.

The catalysts used in Example 26-29 were the same as used in Example 20.

The comparative catalyst A, B and C used in Example 30, 31-32, and 33 were the same catalyst as used in Example 22, 23 and 24, respectively.

The process condition and the results of the aromatization reaction are shown in Table 2, which follows.

The results of Table 2 show that use of catalysts according to the invention results in very high selectivities for aromatics and much less production of methane and ethane than by use of the comparative catalysts A, B, C, for the conversion of propane to aromatics.

TABLE 2

| | Example | | | | | | | |
|---|---|---|---|---|---|---|---|---|
| | 26 | 27 | 28 | 29 | 30 | 31 | 32 | 33 |
| Zn wt % | 3 | 3 | 3 | 3 | 3 | 3 | 3 | 3 |

TABLE 2-continued

| | Example | | | | | | | |
|---|---|---|---|---|---|---|---|---|
| | 26 | 27 | 28 | 29 | 30 | 31 | 32 | 33 |
| Temp. °C. | 535 | 565 | 545 | 545 | 535 | 535 | 565 | 535 |
| On stream time, Hr | 4 | 4 | 2 | 4 | 4 | 4 | 3 | 4 |
| Feed | C3H8 | C3H8 | C3H8 | C3H8 | C3H8 | C3H8 | C3H8 | C3H8 |
| WHSV (§) | 1.26 | 1.26 | 2.67 | 4.32 | 1.26 | 1.26 | 1.26 | 1.26 |
| Conversion wt % | 64.19 | 80.30 | 58.56 | 45.73 | 93.80 | 86.25 | 97.14 | 88.87 |
| Hydrocarbon-Distribtuion wt % | | | | | | | | |
| Methane | 15.45 | 14.83 | 13.78 | 11.70 | 18.94 | 18.42 | 20.28 | 18.16 |
| Ethylene | 4.44 | 3.71 | 5.16 | 6.59 | 1.18 | 1.38 | 1.87 | 1.51 |
| Ethane | 13.69 | 15.83 | 13.56 | 11.19 | 30.88 | 29.43 | 27.90 | 32.07 |
| Propylene | 3.64 | 3.66 | 5.18 | 7.76 | 1.33 | 1.78 | 1.05 | 2.30 |
| Butanes | 0.52 | 0.29 | 0.68 | 1.01 | 0.06 | 0.11 | 0.01 | 0.15 |
| Butenes | 0.78 | 0.35 | 1.01 | 1.74 | 0.12 | 0.18 | 0.06 | 0.25 |
| C5+ PON | 0.10 | 0.00 | 0.14 | 0.24 | 0.00 | 0.00 | 0.00 | 0.00 |
| Benzene | 20.59 | 24.49 | 22.70 | 21.52 | 19.38 | 18.28 | 19.21 | 19.48 |
| Toluene | 22.23 | 22.49 | 24.69 | 24.06 | 17.24 | 16.55 | 16.47 | 17.20 |
| Xylenes | 8.52 | 6.99 | 9.78 | 10.67 | 5.82 | 5.87 | 4.75 | 5.51 |
| C9+ Ar. | 10.04 | 7.37 | 3.31 | 3.53 | 5.04 | 8.01 | 8.41 | 3.36 |
| Product Selectivity, % | | | | | | | | |
| Aromatics | 61.38 | 61.34 | 60.48 | 59.78 | 47.48 | 48.71 | 48.84 | 45.55 |
| CH4 + C2H6 | 29.14 | 30.66 | 27.34 | 22.89 | 49.82 | 47.85 | 48.18 | 50.23 |
| Aromatic yields | 39.40 | 49.26 | 35.42 | 27.34 | 44.54 | 42.01 | 47.44 | 40.48 |

(§) Space velocity: g/feed/g catalyst · hour.

EXAMPLE 34-35

The following Examples illustrate the aromatization of i-butane using catalysts according to the invention prepared with different amount of ZnS.

A catalyst prepared as described in Example 1 and containing about 9 wt% Zn was activated by calcination in air at 500° C. for 6 hours, followed by three times ion-exchange using 10 ml of 2M acetic acid solution per gram catalyst for 1 hour in each ion-exchange step. The ion-exchanged catalyst was then washed with water, dried at 130° C. for 4 hours and finally calcined in air at 500° C. for 6 hours. The catalytic activity of the final catalyst was tested as described in Example 20.

The conditions used and the results of the aromatization reactions are shown in Table 3, which follows.

EXAMPLE 36-39

A catalyst prepared as described in Example 11 and containing about 3 wt% Zn was activated as described in Example 34.

The conditions used and the results of the aromatization reactions are shown in Table 3.

EXAMPLE 40-41

A sample of the catalyst described in Example 19, containing about 1 wt% Zn was activated as described in Example 34.

The conditions used and the results of the aromatization reactions are given in Table 3.

TABLE 3

| | Example | | | | | | | |
|---|---|---|---|---|---|---|---|---|
| | 34 | 35 | 36 | 37 | 38 | 39 | 40 | 41 |
| Zn/SiO2 mole | 0.140 | 0.140 | 0.035 | 0.035 | 0.035 | 0.035 | 0.011 | 0.011 |
| Temp. °C. | 500 | 500 | 502 | 501 | 502 | 502 | 500 | 502 |
| On stream time, Hr | 3 | 8 | 2 | 9 | 21 | 37 | 8 | 24 |
| Feed | i-C4H10 | i-C4H10 | i-C4H10 | i-C4H10 | i-C4H10 | i-C4H10 | i-C4H10 | i-C4H10 |
| WHSV (§) | 1.66 | 1.66 | 1.66 | 1.66 | 1.66 | 1.66 | 1.66 | 1.66 |
| Conversion wt % | 98.50 | 97.71 | 95.72 | 96.66 | 95.81 | 94.64 | 95.53 | 92.73 |
| Hydrocarbon-Distribtuion wt % | | | | | | | | |
| Methane | 10.64 | 10.48 | 9.97 | 11.15 | 10.00 | 10.75 | 11.02 | 10.74 |
| Ethylene | 0.93 | 1.11 | 3.01 | 2.75 | 2.63 | 3.01 | 2.74 | 2.90 |
| Ethane | 11.62 | 10.82 | 4.34 | 4.98 | 5.03 | 4.97 | 5.41 | 5.43 |
| Propylene | 2.54 | 2.91 | 3.77 | 3.46 | 3.68 | 4.50 | 3.94 | 4.77 |
| Propane | 13.37 | 12.90 | 10.63 | 9.66 | 9.23 | 8.98 | 9.47 | 9.35 |
| Butanes | 0.57 | 0.65 | 0.70 | 0.64 | 0.73 | 0.93 | 0.86 | 1.08 |
| Butenes | 3.90 | 4.68 | 4.16 | 4.00 | 4.36 | 4.93 | 4.72 | 5.62 |
| C5+ PON | 0.15 | 0.22 | 0.69 | 0.64 | 0.67 | 0.76 | 0.72 | 1.01 |
| Benzene | 14.63 | 14.27 | 14.41 | 15.11 | 14.80 | 14.63 | 14.43 | 13.63 |
| Toluene | 25.06 | 25.01 | 28.07 | 27.57 | 28.24 | 26.42 | 27.81 | 25.55 |
| Xylenes | 13.50 | 13.28 | 15.22 | 14.96 | 14.61 | 14.55 | 14.51 | 14.41 |
| C9+ Ar. | 3.1 | 3.67 | 5.01 | 5.08 | 6.02 | 5.56 | 4.38 | 5.50 |
| Product Selectivity, % | | | | | | | | |
| Aromatics | 56.29 | 56.23 | 62.71 | 62.72 | 63.67 | 61.16 | 61.13 | 59.09 |
| CH4 + C2H6 | 22.26 | 21.30 | 14.31 | 16.13 | 15.03 | 15.72 | 16.43 | 16.17 |
| Aromatic yields | 55.45 | 54.94 | 60.03 | 60.63 | 61.00 | 57.88 | 58.40 | 54.79 |

(§) Space velocity: g feed/g catalyst · hour.

EXAMPLE 42-49

These Examples illustrate the effect of steam treating a catalyst prepared as in Example 36.

The hydrogen form of the catalyst was treated in air containing 2.5% water at 500° C. for 168 hours (Example 42-44) and for 332 hours (Example 45-49).

The treated catalysts were loaded in a reactor and tube as described herein before, and heated under dry nitrogen at 500° C. before i-butane was introduced. The process conditions and results after different hours on stream are shown in the following Table 4.

TABLE 4

| | Example | | | | | | | |
|---|---|---|---|---|---|---|---|---|
| | 42 | 43 | 44 | 45 | 46 | 47 | 48 | 49 |
| Temp. °C. | 502 | 502 | 502 | 502 | 502 | 502 | 502 | 502 |
| On stream time, Hr | 3 | 6 | 25 | 4 | 15 | 27 | 39 | 55 |
| Feed | i-C4H10 | i-C4H10 | i-C4H10 | i-C4H10 | i-C4H10 | i-C4H10 | i-C4H10 | i-C4H10 |
| WHSV (§) | 1.66 | 1.66 | 1.66 | 1.66 | 1.66 | 1.66 | 1.66 | 1.66 |
| Conversion wt % | 95.21 | 95.17 | 95.58 | 95.37 | 96.42 | 95.21 | 96.11 | 94.19 |
| Hydrocarbon-Distribtuion wt % | | | | | | | | |
| Methane | 10.64 | 10.56 | 10.90 | 9.99 | 10.72 | 8.56 | 8.47 | 8.84 |
| Ethylene | 3.17 | 3.13 | 2.85 | 3.22 | 3.09 | 2.87 | 2.86 | 2.93 |
| Ethane | 3.97 | 4.09 | 4.95 | 3.86 | 4.42 | 4.20 | 4.44 | 4.51 |
| Propylene | 3.98 | 3.96 | 3.77 | 3.97 | 3.74 | 3.65 | 3.86 | 4.35 |
| Propane | 11.55 | 11.05 | 9.92 | 11.13 | 9.83 | 8.58 | 8.65 | 8.96 |
| Butanes | 0.71 | 0.74 | 0.77 | 0.73 | 0.68 | 0.73 | 0.81 | 0.89 |
| Butenes | 4.14 | 4.29 | 4.30 | 4.05 | 3.86 | 3.93 | 4.07 | 4.56 |
| C5+ PON | 0.83 | 0.79 | 0.73 | 0.80 | 0.64 | 0.94 | 0.76 | 1.06 |
| Benzene | 14.94 | 14.86 | 15.28 | 14.97 | 16.10 | 15.34 | 16.09 | 14.30 |
| Toluene | 28.80 | 28.76 | 28.00 | 28.46 | 28.26 | 29.09 | 28.36 | 28.23 |
| Xylenes | 13.87 | 13.90 | 14.40 | 14.02 | 14.08 | 15.57 | 14.86 | 14.84 |
| C9+ Ar. | 3.49 | 3.86 | 4.13 | 4.80 | 4.58 | 6.54 | 6.77 | 6.53 |
| Product Selectivity, % | | | | | | | | |
| Aromatics | 61.10 | 61.38 | 61.81 | 62.24 | 63.02 | 66.54 | 66.08 | 63.90 |
| CH4 + C2H6 | 14.61 | 14.65 | 15.85 | 13.85 | 15.14 | 12.76 | 12.91 | 13.35 |
| Aromatic yields | 58.17 | 58.42 | 59.08 | 59.36 | 60.76 | 63.35 | 63.51 | 60.19 |

(§) Space velocity: g feed/g catalyst · hour.

EXAMPLE 50-51

The catalyst prepared in Example 11 was activated by calcining in air at 550° C. for 4 hours, followed by ion-exchange two times with 15 ml of 1M NH$_4$NO$_3$ per gram catalyst, washing with water, drying at 130° C. for 2 hours and finally calcining in air at 538° C. for 2 hours.

The hydrogen form of the catalyst was tested for aromatization of i-butane as feed as described in Example 20. The temperature, flow rates and the results of the aromatization reaction are shown in Table 5, which follows.

EXAMPLE 52-53

Five gram of the catalyst described in Example 50 were mixed with 5 gram LUDOX AS 30 (containing 30 wt% silica, supplied by E. I. DU PONT), then evaporated to dryness and dried at 130° C. for 2 hours. The obtained catalyst was crashed to particles of 0.3-0.5 mm and calcined in air at 538° C. for 2 hours.

The activity of the catalyst was tested as described in Example 50. The temperature, flow rates and the results of the aromatization reaction are shown in Table 5 below.

TABLE 5

| | Example | | | |
|---|---|---|---|---|
| | 50 | 51 | 52 | 53 |
| Temp. °C. | 564 | 564 | 502 | 502 |
| On stream time, Hr | 3 | 9 | 6 | 20 |
| Feed | i-C4H10 | i-C4H10 | i-C4H10 | i-C4H10 |
| WHSV (§) | 1.66 | 1.66 | 1.66 | 1.66 |
| Conversion wt % | 99.88 | 99.79 | 97.28 | 96.63 |
| Hydrocarbon-Distribtuion wt % | | | | |
| Methane | 13.15 | 12.98 | 8.86 | 8.48 |
| Ethylene | 2.75 | 3.30 | 2.78 | 2.60 |
| Ethane | 7.64 | 6.76 | 5.87 | 5.67 |
| Propylene | 2.10 | 2.98 | 3.45 | 3.64 |
| Propane | 5.90 | 5.88 | 10.13 | 9.44 |
| Butanes | 0.15 | 0.28 | 0.62 | 0.71 |
| Butenes | 0.69 | 1.14 | 3.87 | 4.37 |
| C5+ PON | 0.01 | 0.06 | 0.54 | 0.64 |
| Benzene | 24.11 | 22.28 | 14.92 | 15.19 |
| Toluene | 29.08 | 29.29 | 27.63 | 27.66 |
| Xylenes | 10.70 | 10.49 | 15.26 | 14.97 |
| C9+ Ar. | 3.72 | 4.54 | 6.05 | 6.61 |
| Product Selectivity, % | | | | |
| Aromatics | 67.61 | 66.60 | 63.86 | 64.43 |
| CH4 + C2H6 | 20.79 | 19.74 | 14.73 | 14.15 |
| Aromatic yields | 67.53 | 66.46 | 62.12 | 62.26 |

(§) Space velocity: g feed/g catalyst · hour.

EXAMPLE 54-56

These Examples illustrate aromatization of i-butane by catalysts of a modified aluminosilicate according to the invention with high SiO$_2$/Al2O3 mole ratio. The catalyst used was prepared as in Example 6 and activated as in Example 50.

The hydrogen form of the catalyst was tested for aromatization of i-butane as feed. The conditions and results of the aromatization process are shown in the following Table 6.

TABLE 6

| | Example | | |
|---|---|---|---|
| | 54 | 55 | 56 |
| Zn/SiO$_2$ mole | 0.12 | 0.12 | 0.12 |
| Temp. °C. | 503 | 573 | 573 |
| On stream time, Hr | 3 | 4 | 6 |
| Feed | i-C4H10 | i-C4H10 | i-C4h10 |
| WHSV (§) | 1.66 | 3.32 | 6.62 |
| Conversion wt % | 37.47 | 72.40 | 49.02 |
| Hydrocarbon-Distribtuion wt % | | | |
| Methane | 3.58 | 7.25 | 5.79 |
| Ethylene | 0.88 | 1.86 | 1.29 |
| Ethane | 1.44 | 2.16 | 0.56 |

TABLE 6-continued

| | Example | | |
|---|---|---|---|
| | 54 | 55 | 56 |
| Propylene | 6.62 | 10.85 | 11.77 |
| Propane | 3.89 | 4.43 | 1.94 |
| Butanes | 0.00 | 0.00 | 0.00 |
| Butenes | 56.27 | 48.85 | 66.81 |
| C5— PON | 1.60 | 0.65 | 0.53 |
| Benzene | 2.17 | 4.55 | 1.78 |
| Toluene | 4.33 | 6.83 | 3.05 |
| Xylenes | 10.08 | 11.14 | 5.94 |
| C9+ Ar. | 9.15 | 1.43 | 0.55 |
| Product Selectivity, % | | | |
| Aromatics | 25.73 | 23.95 | 11.32 |
| CH4 + C2H6 | 5.02 | 9.41 | 6.35 |
| Aromatic yields | 9.64 | 17.34 | 5.55 |

(§) Space velocity: g feed/g catalyst · hour.

EXAMPLE 57-64

These Examples illustrate aromatization of i-butane by catalysis of modified aluminosilicates according to the invention containing different amounts of both CuS and ZnS.

The catalysts tested in Example 57-58 were prepared as in Example 13, the catalysts tested in Example 59-60 were prepared as in Example 14, the catalysts tested in Example 61-62 were prepared as in Example 15, and the catalysts tested in Example 63-64 were prepared as in Example 2.

The catalysts were activated by calcination in nitrogen at 500° C. for 3 hours and then for 1 hour at 500° C. in air. The catalysts were ion-exchanged three times using 15 ml of 1M acetic acid solution per gram catalyst, washed with water, dried at 130° C. for 16 hours and finally calcined in air at 480 for 6 hours.

The hydrogen form of the catalysts were tested as described in Example 20. The process conditions and the results of the aromatization process is shown in Table 7 below.

EXAMPLE 65-68

These Examples illustrate aromatization of propane in the presence of a CuS/ZnS modified aluminosilicate catalysts according to the invention.

The catalyst used in Example 65-66 was the catalyst as used in Example 59, and the catalyst used in Example 67-68 was the catalyst used in Example 63. The catalyst in Example 67 was ion-exchanged with Ga(NO3)3.9 H2O solution, dried at 120° C. and calcined at 538° C. for 2 hours in air, resulting in a catalyst containing about 0.8 wt% of added Ga.

The catalysts were tested in the aromatization as described in Example 20. The temperature, flow rates and the results of the reaction are shown in Table 8 below.

TABLE 8

| | Example | | | |
|---|---|---|---|---|
| | 65 | 66 | 67 | 68 |
| Temp. °C. | 535 | 565 | 500 | 565 |
| On stream time, Hr | 6 | 7 | 4 | 2 |
| Feed | C3H8 | C3H8 | C3H8 | C3H8 |
| WHSV (§) | 1.26 | 1.26 | 1.20 | 1.20 |
| Conversion wt % | 67.49 | 87.56 | 27.16 | 71.27 |
| Hydrocarbon-Distribtuion wt %: | | | | |
| Methane | 11.42 | 13.85 | 11.04 | 13.43 |
| Ethylene | 2.54 | 2.24 | 5.11 | 4.92 |
| Ethane | 17.72 | 21.05 | 16.95 | 20.47 |
| Propylene | 4.56 | 3.27 | 0.00 | 6.91 |
| Butanes | 0.47 | 0.19 | 2.24 | 0.54 |
| Butenes | 0.74 | 0.24 | 3.24 | 0.71 |
| C5+ PON | 0.06 | 0.00 | 0.41 | 0.00 |
| Benzene | 23.43 | 24.93 | 19.23 | 20.96 |
| Toluene | 21.57 | 19.69 | 20.82 | 20.58 |
| Xylenes | 8.64 | 6.04 | 11.00 | 7.07 |
| C9+ Ar. | 8.86 | 8.49 | 9.95 | 4.41 |
| Product Selectivity, % | | | | |
| Aromatics | 62.50 | 59.15 | 61.00 | 53.02 |
| CH4 + C2H6 | 29.14 | 34.90 | 27.99 | 33.90 |
| Aromatic yield | 42.18 | 51.79 | 16.57 | 37.79 |

(§) Space velocity: g feed/g catalyst · hour.

TABLE 7

| | Example | | | | | | | |
|---|---|---|---|---|---|---|---|---|
| | 57 | 58 | 59 | 60 | 61 | 62 | 63 | 64 |
| Zn/SiO2 mole | 0.015 | 0.015 | 0.035 | 0.035 | 0.070 | 0.070 | 0.110 | 0.110 |
| Cu/SiO2 mole | 0.012 | 0.012 | 0.028 | 0.057 | 0.057 | 0.930 | 0.930 | |
| Zn/Cu mole | 1.31 | 1.31 | 1.28 | 1.28 | 1.24 | 1.24 | 1.15 | 1.15 |
| Temp. °C. | 501 | 502 | 502 | 508 | 502 | 502 | 500 | 502 |
| On stream time, Hr | 4 | 15 | 3 | 17 | 5 | 11 | 3 | 17 |
| Feed | i-C4H10 | i-C4H10 | i-C4H10 | i-C4H10 | i-C4H10 | i-C4H10 | i-C4H10 | i-C4H10 |
| WHSV (§) | 1.66 | 1.50 | 1.66 | 1.66 | 1.80 | 1.80 | 1.66 | 0.62 |
| Conversion wt % | 96.22 | 98.20 | 96.62 | 96.10 | 94.97 | 95.03 | 95.91 | 97.53 |
| Hydrocarbon-Distribtuion wt % | | | | | | | | |
| Methane | 8.91 | 9.50 | 8.78 | 9.24 | 9.48 | 9.39 | 11.23 | 9.59 |
| Ethylene | 2.78 | 2.61 | 2.12 | 2.33 | 2.33 | 2.33 | 2.51 | 1.20 |
| Ethane | 4.85 | 5.35 | 7.28 | 6.57 | 7.21 | 6.81 | 5.98 | 9.93 |
| Propylene | 3.83 | 3.80 | 3.65 | 4.53 | 4.40 | 4.52 | 4.05 | 2.91 |
| Propane | 10.33 | 9.55 | 10.31 | 9.39 | 9.93 | 9.21 | 9.47 | 10.31 |
| Butanes | 0.78 | 0.77 | 0.82 | 1.22 | 1.07 | 1.22 | 0.80 | 0.64 |
| Butenes | 4.58 | 4.60 | 5.04 | 6.24 | 5.67 | 5.59 | 5.26 | 3.94 |
| C5+ PON | 0.61 | 0.51 | 0.56 | 0.81 | 0.62 | 0.63 | 0.65 | 0.19 |
| Benzene | 14.73 | 15.84 | 14.48 | 13.52 | 14.73 | 14.81 | 13.72 | 14.73 |
| Toluene | 27.53 | 25.99 | 25.52 | 25.14 | 24.58 | 24.97 | 24.55 | 24.34 |
| Xylenes | 14.63 | 14.50 | 15.96 | 15.45 | 14.88 | 14.99 | 16.88 | 15.43 |
| C9+ Ar. | 6.44 | 6.98 | 5.48 | 5.56 | 5.11 | 5.61 | 4.90 | 6.79 |
| Product Selectivity, % | | | | | | | | |
| Aromatics | 63.33 | 63.31 | 61.44 | 59.67 | 59.30 | 60.38 | 60.05 | 61.29 |
| CH4 + C2H6 | 13.76 | 14.85 | 16.06 | 15.81 | 16.69 | 16.20 | 17.21 | 19.52 |
| Aromatic yields | 60.94 | 62.17 | 59.36 | 57.34 | 56.32 | 57.38 | 57.59 | 59.78 |

(§) Space velocity: g feed/g catalyst · hour.

EXAMPLE 69-73

These Examples illustrate use of the modified aluminosilicate according to the invention in the aromatization of a propane/propene mixture (Example 69), n-hexane (Example 70-71) and propene (Example 72-73).

The catalyst in Example 69 was the same as used in Example 20, the feed was a 90/10 vol% mixture of propane/propene. The catalysts in Example 70-71 were the same as used in Example 65, the feed was a 84/16 vol% mixture of $N_2$/n—$C_6H_{14}$.

The catalyst in Example 72-73 was prepared as in Example 19 and activated as described in Example 20.

The catalysts were tested as described in Example 20. The condition used and the results obtained are given in Table 9 below.

TABLE 9

| | Example | | | | |
|---|---|---|---|---|---|
| | 69 | 70 | 71 | 72 | 73 |
| Temp. °C. | 535 | 480 | 471 | 462 | 475 |
| On stream time. Hr | 9 | 4 | 5 | 4 | 6 |
| Feed | C3/C3= | C6H14 | C6H14 | C3H6 | C3H6 |
| WHSV (§) | 1.30(a) | 0.63 | 1.89 | 4.00 | 1.65 |
| Conversion wt % | 78.03(a) | 89.32 | 47.52 | 96.63 | 97.87 |
| Hydrocarbon-Distribution wt % | | | | | |
| Methane | 13.72 | 3.02 | 2.23 | 1.70 | 1.92 |
| Ethylene | 3.12 | 6.50 | 9.24 | 2.25 | 1.59 |
| Ethane | 17.12 | 6.12 | 4.45 | 1.77 | 2.08 |
| Propane | | 9.33 | 7.65 | 12.33 | 10.14 |
| Propylene | | 10.21 | 17.69 | | |
| Butanes | 0.27 | 6.56 | 10.18 | 7.17 | 3.55 |
| Butenes | 0.45 | 5.26 | 6.80 | 4.59 | 2.68 |
| C5+ PON | 0.06 | 1.07 | 2.15 | 3.27 | 1.17 |
| Benzene | 25.63 | 16.45 | 12.26 | 6.58 | 7.22 |
| Toluene | 24.32 | 18.83 | 12.95 | 30.50 | 27.00 |
| Xylenes | 8.78 | 14.50 | 11.38 | 21.87 | 28.81 |
| C9+ Ar. | 6.53 | 2.15 | 3.06 | 7.93 | 13.84 |
| Product Selectivity. % | | | | | |
| Aromatics | 65.26 | 51.93 | 39.65 | 66.88 | 76.87 |
| CH4 + C2H6 | 30.84 | 9.14 | 6.68 | 3.47 | 4.00 |
| Aromatic yields | 50.92 | 46.38 | 18.84 | 64.63 | 75.23 |

(a)Calculated as the sume of propane and propene.
(§) Space velocity: g feed/g catalyst · hour.

In general, the results set forth in Table 1-9, obtained by use of metal sulfide modified aluminosilicate catalysts according to the invention show a high yield and improved selectivity in the conversion of an olefinic and paraffinic feedstock to aromatic compounds.

Compared to known catalysts the production of methane and ethane during the conversion process is low. This is a very attractive feature of the present invention, in particular, in aromatization processes, where recycling of non-aromatic fractions is required, as the reactivity of methane and ethane is very low during aromatization processes.

I claim:

1. A crystalline aluminosilicate having in its anhydrous state a formula expressed in terms of mole ratios as follows:

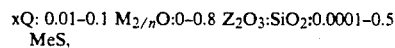

xQ: 0.01–0.1 $M_{2/n}O$:0–0.8 $Z_2O_3$:$SiO_2$:0.0001–0.5 MeS, wherein:

Q is an organic nitrogen compound;
Z is aluminum, boron, gallium or mixtures thereof;
x is between 0 and 0.5;
M is at least one metal cation of valence n; and
Me is at least one of the metals which form an insoluble sulfide compound homogeneously distributed within said crystalline aluminosilicate.

2. A crystalline aluminosilicate according to claim 1, wherein M is selected from the group consisting of sodium, potassium and any other cation capable of replacing sodium or potassium by ion exchange.

3. A crystalline aluminosilicate according to claim 1, wherein Me is selected from the group consisting of cadmium, cobalt, copper, iron, lead, manganese, nickel, silver, tin, zinc, platinum, palladium, rhodium, ruthenium, and combinations thereof.

4. A crystalline aluminosilicate according to claim 3, wherein Me is selected from the group consisting of zinc, copper and combinations thereof.

5. A crystalline aluminosilicate according to claim 1, wherein Q is a tetraalkylammonium compound, which is represented by the formula $R^1R^2R^3R^4N^+X^-$, wherein any of $R^1$, $R^2$, $R^3$, and $R^4$ is independently chosen from a methyl, ethyl, propyl, or a butyl-group and wherein $X^-$ is a halide or a hydroxide ion.

6. A crystalline aluminosilicate according to claim 5, wherein $R^1$, $R^2$, $R^3$, and $R^4$ are propyl.

7. A crystalline aluminosilicate resulting from thermal treatment of an aluminosilicate according to claim 1.

8. A crystalline aluminosilicate resulting from ion-exchange of an aluminosilicate according to claim 7 with a proton donating solution.

9. A crystalline aluminosilicate according to claim 1, wherein x is zero.

10. A crystalline aluminosilicate resulting from ion-exchange of an aluminosilicate according to claim 9 with a proton donating solution.

11. A process of preparing a crystalline aluminosilicate according to claim 1 comprising the steps of:

i) preparing an insoluble sulfide of the metal Me by precipitation of an aqueous solution of a soluble salt of Me with a soluble sulfide compound;

ii) preparing a mixture comprising a source for an oxide of silicon, optionally a source for an oxide of Z, an oxide of M, optionally an organic nitrogen compound Q and water, and having a composition in terms of mole ratios as follows;

| $Z_2O_3/SiO_2$ = | 0–0.08 |
|---|---|
| $H_2O/SiO_2$ | 5–200 |
| $M/SiO_2$ | 0.01–3.0 |
| $Q/SiO_2$ | 0–2.0 |
| $OH^-/SiO_2$ | 0–[1, 0] 1.0 | wherein Z, M, Q have the above definitions, iii) admixing the insoluble metal sulfide precipitate of step i) to the mixture of step ii) in a mole ratio of $Me/SiO_2=0.0001–0.5$, iv) maintaining the mixture of step iii) at a temperature of about 80° C. to 200° C. until crystals of the aluminosilicate are formed; and v) separating and drying the so formed crystals at a temperature of between 20° C. and 130° C.

12. A process according to claim 11, wherein the mixture of step ii) has a composition in terms of mole ratios as follows:

$Z_2O_3/SiO_2=0.001–0.7$
$H_2O/SiO_2=5–150$
$M/SiO_2=0.01–2.0$
$Q/SiO_2=0–1.0$ $OH^-/SiO_2 = 0-0.5$.

13. A process according to claim 11, wherein the mixture of step ii) has a composition in terms of mole ratios as follows:

$Z_2O_3/SiO_2 = 0.001-0.05$
$H_2O/SiO_2 = 6-100$
$M/SiO_2 = 0.02-0.7$
$Q/SiO_2 = 0-0.5$
$OH^-/SiO_2 = 0.02-0.4$.

14. A process according to claim 11, wherein the insoluble metal sulfide precipitate of step i) is admixed to the mixture of step ii) in a mole ratio of $Me/SiO_2$ of 0.0005-0.4.

15. A process according to claim 11, wherein the insoluble metal sulfide precipitate of step i) is admixed to the mixture of step ii) in a mole ratio of $Me/SiO_2$ of 0.005-0.3.

16. A method for the conversion of hydrocarbons, comprising the step of contacting the hydrocarbons with a crystalline aluminosilicate having in its anhydrous state a formula expressed in terms of mole ratios as follows:

$xQ:0.01-0.1\ M_{2/n}O:0-0.8\ Z_2O_3:SiO_2:0.0001-0.5\ MeS$.

wherein:
Q is an organic nitrogen compound;
Z is aluminum, boron, gallium or mixtures thereof;
x is between 0 and 0.5;
M is at least one metal cation of valence n; and
Me is at least one of the metals which form an insoluble sulfide compound homogeneously distributed within said crystalline aluminosilicate.

17. The method of claim 16, wherein the hydrocarbons are converted into aromatic compounds.

18. The method of claim 16, wherein the crystalline aluminosilicate is supported on a matrix binder selected from the group consisting of clays, alumina, silica, titania, magnesia, zirconia, thoria, a zinc oxide, a metal sulfide, and compositions thereof.

19. The method of claim 16, wherein the aluminosilicate is a thermally treated aluminosilicate.

20. The method of claim 19, wherein the aluminosilicate is an aluminosilicate resulting from ion-exchange with proton donating solution.

* * * * *